(12) United States Patent
Horiuchi et al.

(10) Patent No.: US 6,588,835 B2
(45) Date of Patent: Jul. 8, 2003

(54) CONTROLLER OF SUNROOF FOR VEHICLE

(75) Inventors: Yoshifumi Horiuchi, Kanagawa-ken (JP); Osamu Kawanobe, Kanagawa-ken (JP); Kimikatsu Okada, Aichi-ken (JP)

(73) Assignees: Ohi Seisakusho Co., Ltd, Kanagawa-ken (JP); Asmo Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/015,461

(22) Filed: Dec. 13, 2001

(65) Prior Publication Data

US 2002/0070587 A1 Jun. 13, 2002

(30) Foreign Application Priority Data

Dec. 13, 2000 (JP) .................................... 2000-378804

(51) Int. Cl.$^7$ ............................................. B60J 7/05
(52) U.S. Cl. ............................... 296/221; 296/223
(58) Field of Search ......................... 296/221, 223, 296/222

(56) References Cited

U.S. PATENT DOCUMENTS

| | | | | |
|---|---|---|---|---|
| 5,098,152 A | * | 3/1992 | Sakai | 296/221 |
| 5,707,102 A | * | 1/1998 | Takahashi et al. | 296/223 |
| 6,290,288 B1 | * | 9/2001 | Ritter et al. | 296/221 |

FOREIGN PATENT DOCUMENTS

| | | |
|---|---|---|
| JP | 2520865 | 9/1991 |
| JP | 2966015 | 9/1991 |
| JP | 8-5852 | 2/1996 |
| JP | 08-186994 | 7/1996 |

* cited by examiner

*Primary Examiner*—Dennis H. Pedder
(74) *Attorney, Agent, or Firm*—Kilpatrick Stockton LLP

(57) ABSTRACT

A controller of a sunroof for a vehicle structured such as to adjust a predetermined over flap amount S to be fixed in correspondence to a power supply voltage of a drive unit or an operating speed of a lid 3 in the case of temporarily descending at the over flap amount S from a fully-closed position, thereafter ascending and stopping at the fully-closed position.

13 Claims, 8 Drawing Sheets

CONTROLLER OF SUNROOF FOR VEHICLE

BACKGROUND OF THE INVENTION

The present invention relates to a controller of a sunroof for a vehicle.

As a sunroof apparatus of a motor vehicle, the structure is made such that a longitudinally moving lid is provided in an opening formed in a roof and the opening is opened and closed by the lid (refer to Japanese Utility Model Application Publication No. 8-5852 as a similar technique).

In the structure mentioned above, a case of fully closing the lid includes a case of fully closing by descending from a tilt-up position and a case of fully closing by ascending from a flap position. However, in the case of fully closing by descending from the tilt-up position, a sliding resistance between the lid and the roof is great. Accordingly, if it is stopped as it is, a rear end position of the lid becomes a little higher and a weather strip is left in a drawn state, so that it is not preferable in view of an appearance.

Accordingly, in the case of fully closing by moving from the tilt-up position, the lid is temporarily descended at a predetermined over flap amount from the fully-closed position, is thereafter ascended and is stopped at the fully-closed position.

SUMMARY OF THE INVENTION

However, in the case of employing the structure made such as to temporarily descend the lid at the predetermined over flap amount from the fully-closed position, thereafter ascend and stop at the fully-closed position, there is a risk that the lid is changed at each time of operating the lid due to various kinds of reasons such as a mounting error of the lid, a change of hardness of the weather strip caused by an environment, a deterioration with time and the like, so that it is necessary to previously set the over flap amount of the lid to be a little greater. Otherwise, it is impossible to obtain the fully closed position at which the lid and the weather strip are securely received.

Accordingly, the over flap amount becomes greater than necessary, the lid descends at the over flap amount, and a time required for ascending is increased.

The present invention is made by taking the condition mentioned above into consideration, and an object of the present invention is to provide a controller of a sunroof for a vehicle which can minimize an over flap amount of a lid. According to a first aspect of the present invention, there is provided a controller of a sunroof for a vehicle comprising:
  a lid provided in an opening formed in a roof of a vehicle body; and
  a drive unit for achieving a fully-closed position closing the opening by a forefront position of the lid, a tilt-up position at which a rear end of the lid ascends from the opening, a flap position at which the rear end of the lid is descended from the opening and a fully-open position at which the lid slides rearward so as to leave open the opening, whereby in the case of moving the lid from the tilt-up position and stopping at the fully-closed position, the lid is temporarily descended at a predetermined over flap amount from the fully-closed position, is thereafter ascended and is stopped at the fully-closed position,
  wherein the over flap amount of the lid is adjusted to be fixed in correspondence to a power supply voltage of the drive unit or an operating speed of the lid.

According to the first aspect of the present invention, it is considered that a reason of changing the over flap amount of the lid is a fluctuation of the power supply voltage of the drive unit for the lid or a fluctuation of the sliding resistance of the lid with respect to the roof. The structure is made such as to adjust the over flap amount in correspondence to the reasons mentioned above. With respect to the sliding resistance of the lid against the roof, an operating speed of the lid becomes smaller as the resistance is great, and the operating speed becomes greater as the resistance is small. Accordingly, the over flap amount is adjusted in correspondence to the operating speed. Since the over flap amount becomes always constant, it is not necessary to previously set the over flap amount to be a little greater and it is sufficient to set to a minimum level. Accordingly, it is possible to shorten a time for which the lid descends at the over flap amount and ascends.

Further, according to a second aspect of the present invention, the structure is characterized by detecting the power supply voltage of the drive unit, and reducing the time of the over flap in the case that the power supply voltage is high and increasing the time of the over flap in the case that the power supply voltage is low, thereby making the over flap amount constant without relation to the power supply voltage.

According to the second aspect of the present invention mentioned above, even when the power supply voltage of an over flap amount drive unit in the drive unit fluctuates, it is possible to make the over flap amount constant by adjusting the time of the over flap.

Further, according to a third aspect of the present invention, the structure is characterized by detecting the operating speed of the lid in a predetermined section of the fully-closed position between the tilt-up position and the over flap position, and reducing the time of the over flap in the case that the operating speed is high and increasing the time of the over flap in the case that the operating speed is low, thereby making the over flap amount constant without relation to the sliding resistance between the lid and the roof.

According to the third aspect of the present invention mentioned above, even when the sliding resistance between the lid and the roof fluctuates, it is possible to make the over flap amount constant by adjusting the time of the over flap.

Further, according to a fourth aspect of the present invention, the structure is characterized by detecting the power supply voltage of the drive unit, and reducing a pulse number of the over flap in the case that the power supply voltage is high and increasing the pulse number of the over flap in the case that the power supply voltage is low, thereby making the over flap amount constant without relation to the power supply voltage.

According to the fourth aspect of the present invention mentioned above, even when the power supply voltage of the drive unit fluctuates, it is possible to make the over flap amount constant by adjusting the pulse of the over flap.

Further, according to a fifth aspect of the present invention, the structure is characterized by detecting the operating speed of the lid near the fully-closed position of the lid moving to the fully-closed position from the tilt-up position, and reducing a pulse number of the over flap in the case that the operating speed is high and increasing the pulse number of the over flap in the case that the operating speed is low, thereby making the over flap amount constant without relation to the sliding resistance between the lid and the roof.

According to the fifth aspect of the present invention mentioned above, even when the sliding resistance between the lid and the roof fluctuates, it is possible to make the over flap amount constant by adjusting the pulse of the over flap.

DESCRIPTION OF THE PREFERRED EMBODIMENT

A description will be given below of a preferred embodiment according to the present invention with reference to the accompanying drawings.

Figure 1:
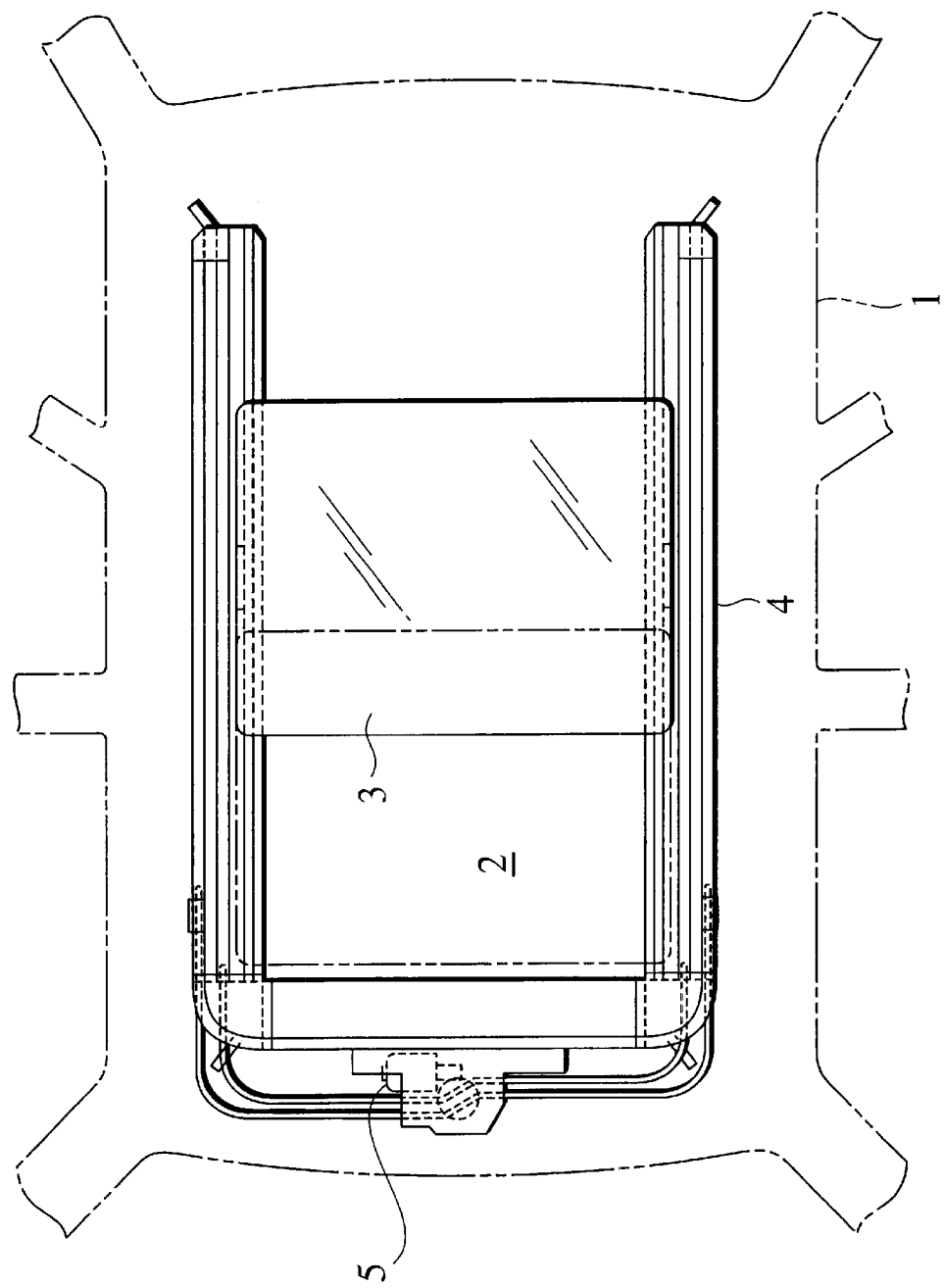
FIG. 1 is a plan view of a sunroof apparatus according to an embodiment of the present invention.
Figure 2:
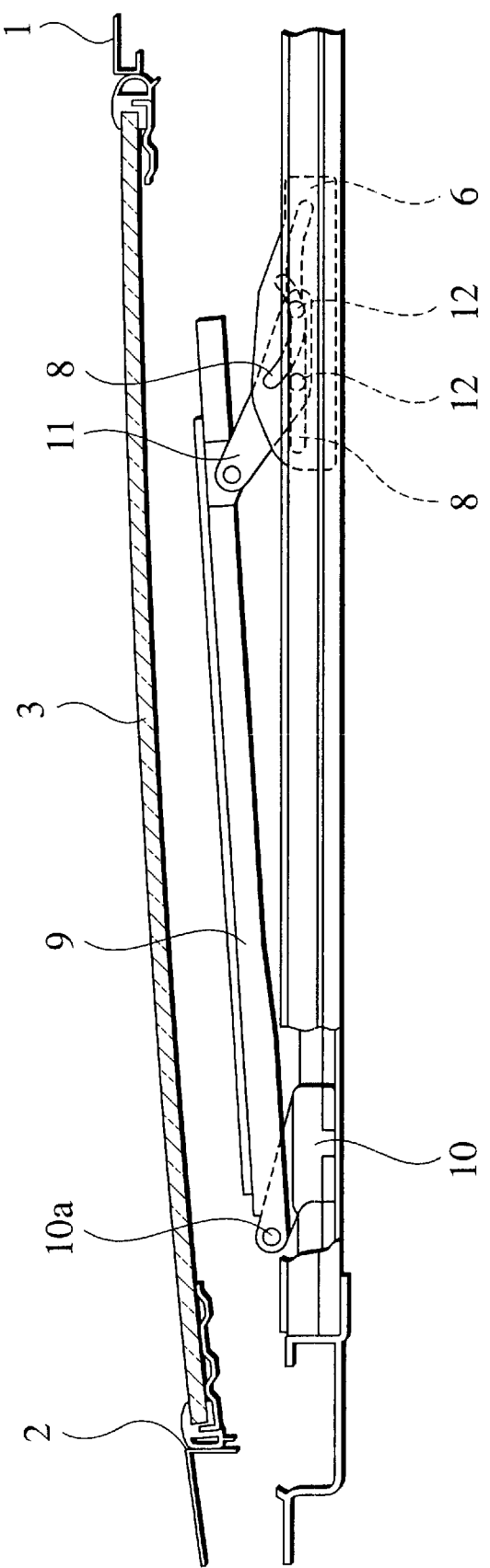
FIG. 2 is a schematically cross sectional view showing a state that a lid is at a fully-closed position.

At first, a description will be given of a structure of a sunroof with reference to FIGS. 1 to 3. An opening 2 for the sunroof is formed in a roof 1 of a motorcar. A lid 3 is provided in the roof 1 so as to face to the opening 2 and freely slide forward and rearward, thereby opening and closing the opening 2.

Side rails 4 formed by an extrusion molding are respectively arranged in both of right and left sides of the opening 2. A motor 5 corresponding to a "drive unit" is provided in a front portion of the opening 2. Cables (not shown) are arranged so as to be extended from the motor 5 to inner portions of the respective side rails 4 in both of the right and left sides. The cables are engaged with a gear of the motor 5, and are structured such as to be simultaneously fed in a longitudinal direction according to the rotation of the motor 5.

Rear sliders 6 moving forward and rearward together with the cables in a state of being connected to the cables are provided in the side rails 4. Guide grooves 8 are provided in the sliders 6.

Supporting members 9 extending along a longitudinal direction are fixed to lower surfaces in both of right and left ends of the lid 3, and are structured such as to integrally move forward and rearward together with the lid 3. The supporting members 9 freely rotate vertically in rear sides around pivot portions 10a of front sliders 10 engaged within the side rails 4 so as to freely slide forward and rearward, and rear link portions 11 are structured such as to stand up and come down by the guide grooves 8.

The guide grooves 8 are schematically formed in an "X" shape, and a pair of guide pins 12 formed in each of the link portions 11 are movably engaged with the guide groove 8.

The lid 3 is moved in the following manner. At first, in a state that the guide pins 12 of the link portions 11 are engaged with middle portions of the guide grooves 8 in the sliders 6, the sliders 6 are moved forward from a fully-closed position (FIG. 2) in which the lid 3 closes the opening 2, due to a driving force of the motor 5. Then, the guide pins 12 reach rear end portions from the middle portions of the guide grooves 8, and the lid 3 becomes at a tilt-up position in which a rear end thereof is lifted up rather than the opening 2 (FIG. 3).

Figure 3:
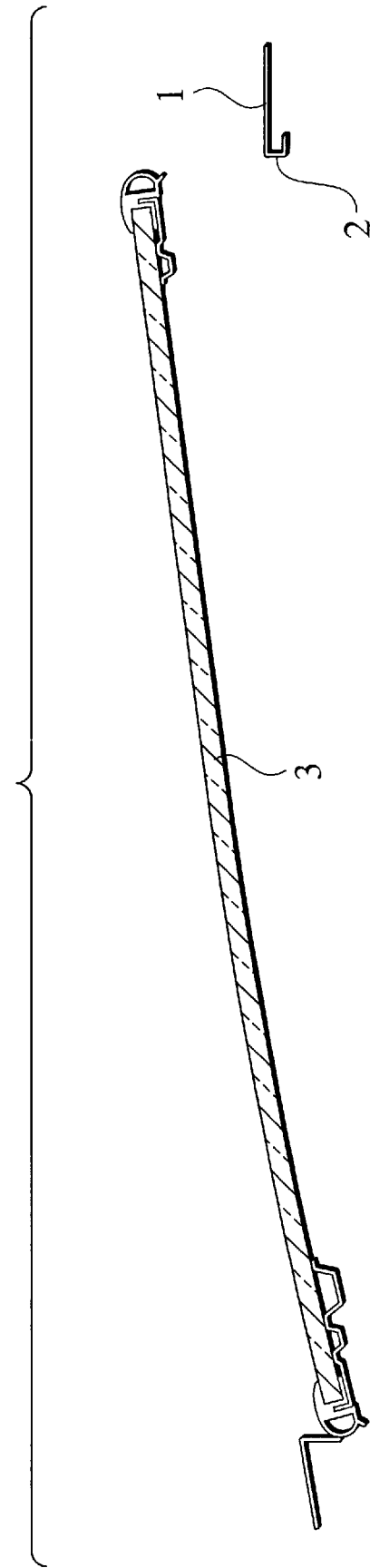
FIG. 3 is a schematically cross sectional view showing a state that the lid is at a tilt-up position.
Figure 6:
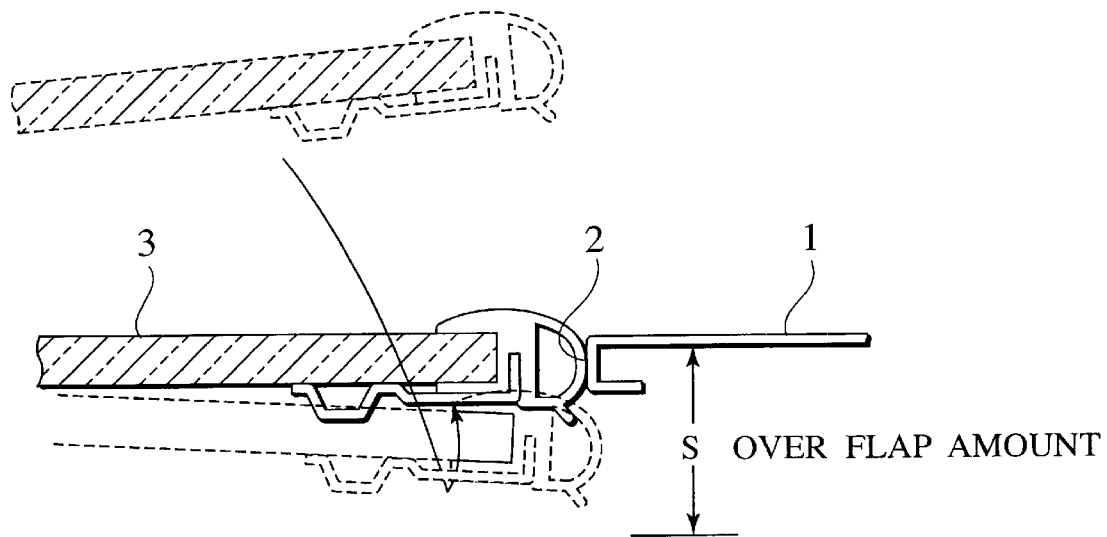
FIG. 6 is a schematically cross sectional view showing an over flap operation of the lid.
Figure 7:
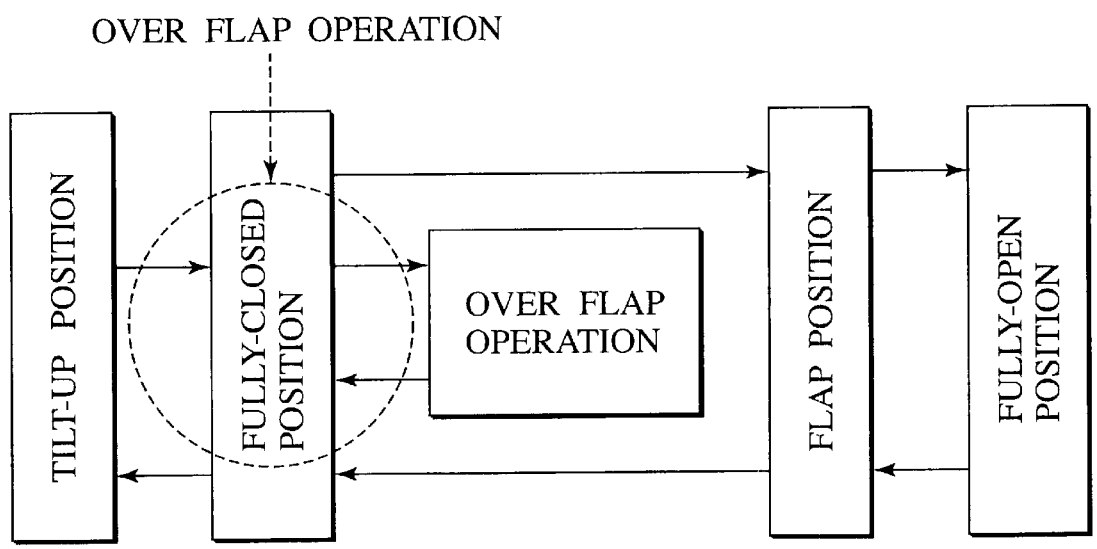
FIG. 7 is a schematic view showing a state that the lid is going to move in a longitudinal direction.

Next, at the tilt-up position shown in FIG. 3, the slider 6 is moved backward due to a driving force of the motor 5. Then, the rear end of the lid 3 descends and becomes at the fully closed position (FIG. 2) in which the opening 2 is closed by the lid 3. Describing in more detail, in the case of moving from the tilt-up position and stopping at the fully-closed position, the lid 3 is temporarily descended at a predetermined over flap amount S rather than the fully-closed position as shown in FIG. 6, is thereafter ascended and is stopped at the fully-closed position. Since the sliding resistance between the lid 3 and the roof 1 is great when descending the lid 3 from the tilt-up position and stopping at the fully-closed position as it is, the structure mentioned above is employed so as to stop the lid 3 at the fully-closed position at a time of moving from the below having a comparatively small sliding resistance. Furthermore, the structure is employed so as not to leave a weather strip.

An operation of temporarily descending the lid 3 at the over flap amount S rather than the fully-closed position, thereafter ascending and stopping at the fully-closed position as mentioned above is called as an "over flap operation". If the over flap amount S in the over flap operation is great, the lid descends at that degree, thereby requiring a lot of time for ascending, and a change of wind sound is generated at a time of traveling at a high speed, thereby applying a sense of discomfort to a passenger. However, according to the embodiment, it is possible to restrict the over flap amount to a minimum level on the basis of a structure mentioned below.

Figure 4:
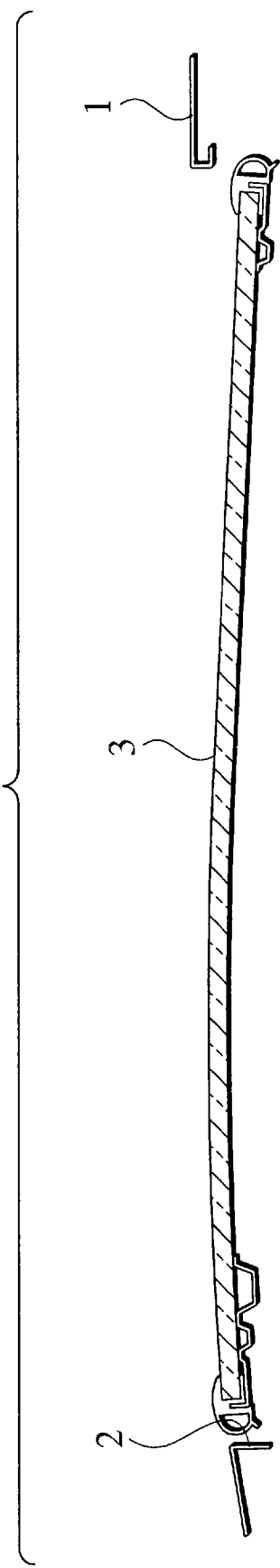
FIG. 4 is a schematically cross sectional view showing a state that the lid is at a flap position.

Further, after the lid 3 passes through the fully-closed position as mentioned above, the guide pins 12 are brought into contact with the front end portions of the guide grooves 8, so that the lid 3 becomes at the flap position (FIG. 4) in which the rear end is descended rather than the opening 2. At this flap position, the lid 3 does not stop.

Figure 5:
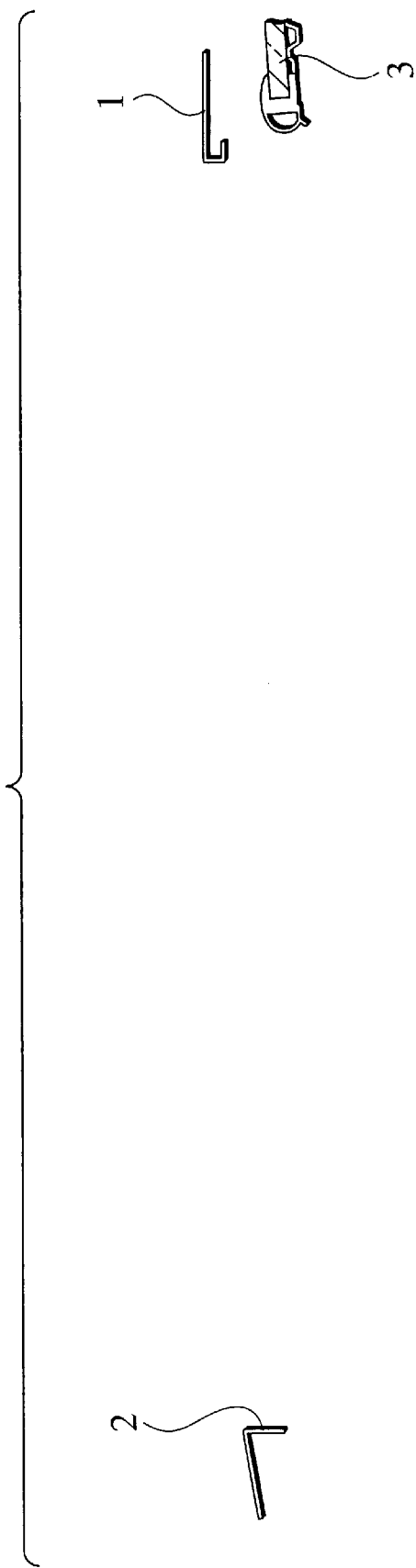
FIG. 5 is a schematically cross sectional view showing a state that the lid is at a fully-open position.

When further moving the lid 3 rearward in a state of engaging the guide pins 12 with the front end portions of the guide grooves 8, the lid 3 becomes in a fully-open state in which the opening 2 is completely left open (FIG. 5).

Further, when moving the lid 3 in a closing direction from the fully-open state, the lid 3 returns to the flap position and the fully-closed position in a reverse order to that mentioned above, and stops at the fully-closed position as it is.

Figure 8:
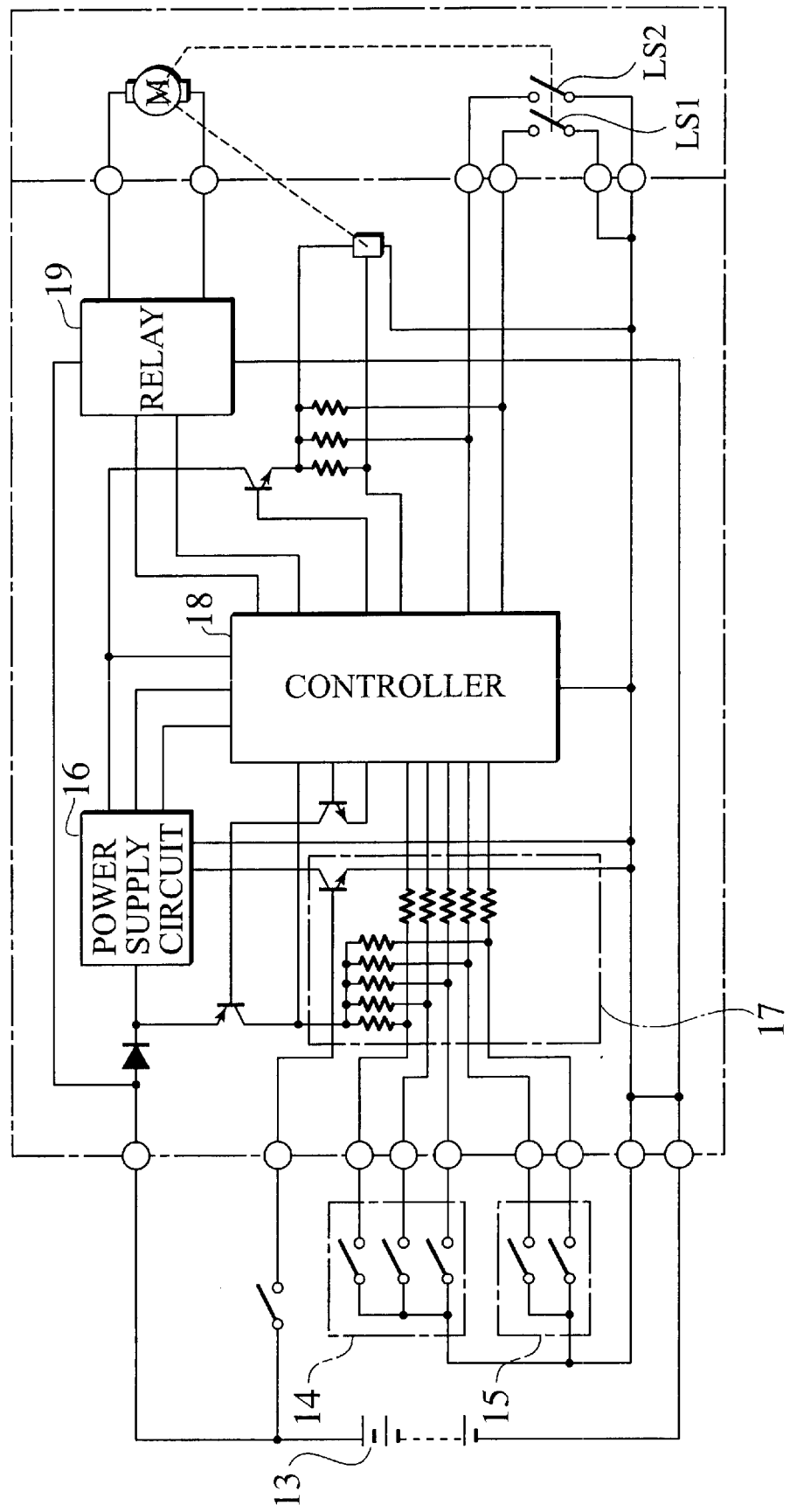
FIG. 8 is a view showing a control circuit of a controller for a sunroof.

FIG. 8 is a view showing a control circuit. Reference numeral 13 denotes a battery, reference numeral 14 denotes a slide switch, reference numeral 15 denotes a tilt switch, reference numeral 16 denotes a power supply circuit, reference numeral 17 denotes an input circuit, reference numeral 18 denotes a controller (CPU), reference numeral 19 denotes a relay, and reference symbols LS1 and LS2 denote a limit switch. An analogue input of the power supply voltage is given to the controller 18, and it is possible to monitor the power supply voltage here.

Figure 9:
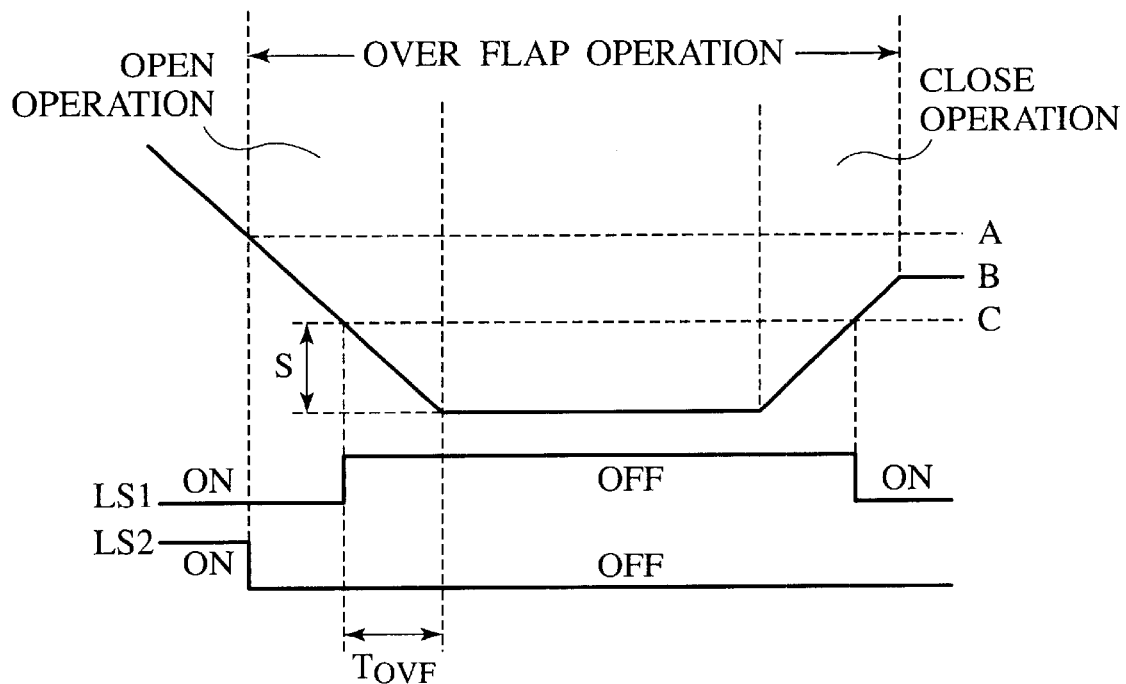
FIG. 9 is a view showing an over flap operation.

Next, a description will be given in detail of an over flap operation in the case of moving the lid 3 from the tilt-up position and stopping at the fully-closed position with reference to FIG. 9. In FIG. 9, a vertical axis indicates a position of the lid, and a horizontal axis indicates a time. Reference symbol "A" denotes a little higher position of the lid 3 in the case that the lid 3 is stopped from the tilt-up position to the fully-closed position as it is, reference symbol "C" denotes a liffle lower position in the case that the lid 3 is stopped from the flap position to the fully-closed position as it is, and reference symbol "B" denotes an optimum fully closed position obtained by the over flap operation. Since the little lower position C does not protrude from the roof 1, there is no problem in view of an appearance such as the little higher position A.

As shown in FIG. 9, when the lid 3 descends from the tilt-up position so as to be at the little higher position A, the limit switch LS2 is turned off, and an over flap operation is forcibly started. Next, the lid moves until the limit switch LS 1 is turned off at the little lower position C. Next, from the little lower position C, the guide pins 12 of the sliders 6 move rearward for a predictive timer time Tovf, and turn over after descending the rear end of the lid 3 at a predetermined over flap amount S so as to return to the optimum position B of the fully-closed position and stop.

A description will be given below of a method of calculating the predictive timer time Tovf defining the over flap amount S on the basis of the controller as first to fourth embodiments.

(First Embodiment)

The over flap amount S is made constant by detecting a power supply voltage V1 on the basis of the voltage monitoring of the controller 18, reducing the over flap time in the case that the power supply voltage is high and increasing the over flap time in the case that the power supply voltage is low. According to the structure mentioned above, it is not necessary to previously set the over flap amount S to be a little greater in correspondence to a fluctuation of the power supply voltage, and it is possible to minimize the over flap amount S.

$$Tovf = -a1 \times V1 + b1$$

Tovf; over flap time
V1; power supply voltage
a1, b1; constant (Second Embodiment)

Figure 10:
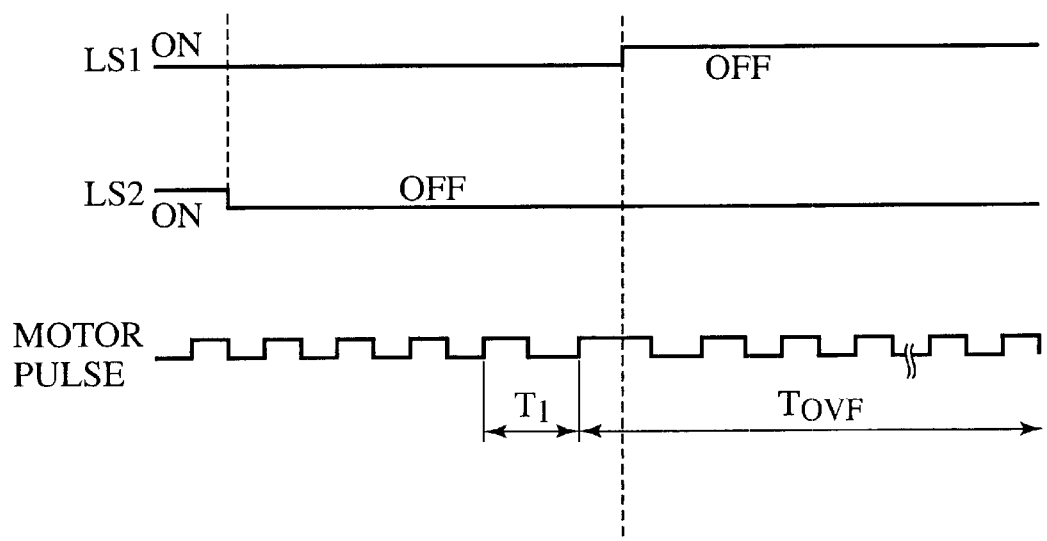
FIG. 10 is a view showing a pulse of a motor.

The structure is made such as to measure a pulse cycle (T1) immediately before the fully-closed position at a time when the lid 3 descends from the tilt-up position (refer to FIG. 10), increase the over flap time in the case that T1 is long (in the case that the speed of the lid is low), and reduce the over flap time in the case that T1 is short (in the case that the speed of the lid is high). The pulse cycle immediately before the fully closed position becomes great in the case that the power supply voltage is low or in the case that the sliding resistance between the lid and the roof near the fully closed position is great.

$$Tovf = a2 \times T1 + b2$$

Tovf; over flap time
T1; pulse cycle immediately before fully closed position or average value of a plurality of pulse cycles
a2, b2; constant In this case, the portion at which the operating speed is measured is not limited to the portion immediately before the fully-closed position, and may be set at any portion from the tilt-up position to the over flap position within a predetermined section of the fully-closed position as far as the operating speed of the lid is affected by the sliding resistance of the weather strip.

(Third Embodiment)

The over flap amount S is made constant by detecting the power supply voltage V1 on the basis of the voltage monitoring of the controller 18, reducing the pulse number of the over flap in the case that the power supply voltage is high and increasing the pulse number of the over flap in the case that the power supply voltage is low.

$$Povf = -a3 \times V1 + b3$$

Povf; pulse number of over flap
V1; power supply voltage
a3, b3; constant (Fourth Embodiment)

The structure is made such as to measure a pulse cycle (T1) immediately before the fully-closed position at a time when the lid 3 descends from the tilt-up position, increase the pulse number of the over flap in the case that T1 is long (in the case that the speed of the lid is low), and reduce the pulse number of the over flap in the case that T1 is short (in the case that the speed of the lid is high). The pulse cycle immediately before the fully closed position becomes great in the case that the power supply voltage is low or in the case that the sliding resistance between the lid and the roof near the fully closed position is great.

$$Povf = a4 \times T1 + b4$$

Povf; pulse number of over flap
t1; pulse cycle immediately before fully closed position or average value of a plurality of pulse cycles
a4, b4; constant

What is claim is:

1. A control apparatus of a sunroof for a vehicle comprising:
    a lid provided in an opening formed in a roof of a vehicle body; and
    a drive unit for achieving a fully-closed position closing the opening by a forefront position of the lid, a tilt-up position at which a rear end of the lid ascends from the opening, a flap position at which the rear end of the lid is descended from the opening and a fully-open position at which the lid slides rearward so as to leave open the opening, whereby in the case of moving the lid from the tilt-up position and stopping at the fully-closed position, the lid is temporarily descended a predetermined over flap amount from the fully-closed position, is thereafter ascended and is stopped at the fully-closed position,
    wherein the over flap amount of the lid is adjusted to be fixed in correspondence to one of a power supply voltage of the drive unit and an operating speed of the lid.

2. A control apparatus of a sunroof for a vehicle according to claim 1, wherein the control apparatus is operative to detect the power supply voltage of the drive unit, and to reduce the time of the over flap in the case that the power supply voltage is high and to increase the time of the over flap in the case that the power supply voltage is low, thereby making the over flap amount constant without relation to fluctuation of the power supply voltage.

3. A control apparatus of a sunroof for a vehicle according to claim 1, wherein the control apparatus is operative to detect the operating speed of the lid at a predetermined section of the fully-closed position between the tilt-up position and the over flap position, and to reduce the time of the over flap in the case that the operating speed is high and to increase the time of the over flap in the case that the operating speed is low, thereby making the over flap amount constant without relation to the sliding resistance between the lid and the roof.

4. A control apparatus of a sunroof for a vehicle according to claim 1, wherein the control apparatus is operative to detect the power supply voltage of the drive unit, and to reduce a pulse number of the over flap in the case that the power supply voltage is high and to increase the pulse number of the over flap in the case that the power supply voltage is low, thereby making the over flap amount constant without relation to fluctuation of the power supply voltage.

5. A control apparatus of a sunroof for a vehicle according to claim 1, wherein the control apparatus is operative to detect the operating speed of the lid near the fully-closed position of the lid moving to the fully-closed position from the tilt-up position, and to reduce a pulse number of the over flap in the case that the operating speed is high and to increase the pulse number of the over flap in the case that the operating speed is low, thereby making the over flap amount constant without relation to the sliding resistance between the lid and the roof.

6. A control apparatus of a sunroof for a vehicle comprising:
   a roof provided in a vehicle body;
   an opening formed in the root;
   a lid provided in the opening;
   a drive unit structured such that the lid has a fully-closed position closing the opening by a forefront position of the lid, a tilt-up position at which a rear end of the lid ascends from the opening, a flap position at which the rear end of the lid is descended from the opening and a fully-open position at which the lid slides rearward so as to leave open the opening, and in the case of moving the lid from the tilt-up position and stopping at the fully-closed position, the lid is temporarily descended a predetermined over flap amount from the fully-closed position, is thereafter ascended and is stopped at the fully-closed position; and
   a controller controlling the drive unit,
   wherein the controller adjusts the over flap amount of the lid to be fixed in correspondence to one of a power supply voltage of the drive unit and an operating speed of the lid.

7. A method of controlling a sunroof for a vehicle comprising:
   moving a lid of an opening formed in a roof of a vehicle body to a fully-closed position closing the opening at a forefront position of the lid by a drive unit;
   a tilt-up step of moving the lid so that a rear end of the lid ascends from the opening after said fully-closed position;
   detecting one of an operating speed of the lid and a power supply voltage of the drive unit;
   a fully-open step in which the lid slide rearward so as to be at a fully-open position leaving open the opening; and
   descending the lid from the fully-closed position an over flap amount calculated based on one of the detected operating speed of the lid and the power supply voltage of the drive unit, thereafter ascending and stopping at the fully-closed position, in a step of moving the lid from the tilt-up position to the fully-closed position.

8. A method of controlling a sunroof for a vehicle comprising:
   moving a lid of an opening formed in a roof of a vehicle body to a fully-closed position closing the opening at a forefront position of the lid by a drive unit;
   a tilt-up step of moving the lid so that a rear end of the lid ascends from the opening after said fully-closed position;
   a fully-open step in which the lid slides rearward so as to be at a fully-open position leaving open the opening;
   descending the lid a predetermined over flap amount from the fully-closed position, thereafter ascending and stopping at the fully-closed position, in a step of moving the lid from the tilt-up position to the fully-closed position;
   detecting a power supply voltage of the drive unit; and
   reducing a time of an over flap in the case that the power supply voltage is high, and increasing the time of the over flap in the case that the electric power voltage is low,
   wherein the over flap amount is made constant without relation to the power supply voltage.

9. A method of controlling a sunroof for a vehicle comprising:
   moving a lid of an opening formed in a roof of a vehicle body to a fully-closed position closing the opening at a forefront position of the lid by a drive unit;
   a tilt-up step of moving the lid so that a rear end of the lid ascends from the opening after said fully-closed position;
   a fully-open step in which the lid slides rearward so as to be at a fully-open position leaving open the opening;
   descending the lid a predetermined over flap amount from the fully-closed position, thereafter ascending and stopping at the fully-closed position, in a step of moving the lid from the tilt-up position to the fully-closed position;
   detecting an operating speed of the lid in a predetermined section of the fully-closed position from the tilt-up position to the over flap position; and
   reducing a time of an over flap in the case that the operating speed is high, and increasing the time of the over flap in the case that the operating speed is low,
   wherein the over flap amount is made constant without relation to a sliding resistance between the lid and the roof.

10. A method of controlling a sunroof for a vehicle comprising:
    moving a lid of an opening formed in a roof of a vehicle body to a fully-closed position closing the opening at a forefront position of the lid by a drive unit;
    a tilt-up step of moving the lid so that a rear end of the lid ascends from the opening after said fully-closed position;
    a fully-open step in which the lid slides rearward so as to be at a fully-open position leaving open the opening;
    descending the lid a predetermined over flap amount from the fully-closed position, thereafter ascending and stopping at the fully-closed position, in a step of moving the lid from the tilt-up position to the fully-closed position;
    detecting a power supply voltage of the drive unit; and
    reducing a pulse number of an over flap in the case that the power supply voltage is high, and increasing the pulse number of the over flap in the case that the electric power voltage is low,
    wherein the over flap amount is made constant without relation to the power supply voltage.

11. A method of controlling a sunroof for a vehicle comprising:
    moving a lid of an opening formed in a roof of a vehicle body to a fully-closed position closing the opening at a forefront position of the lid by a drive unit;
    a tilt-up step of moving the lid so that a rear end of the lid ascends from the opening after said fully-closed position;

a fully-open step in which the lid slides rearward so as to be at a fully-open position leaving open the opening;

descending the lid a predetermined over flap amount from the fully-closed position, thereafter ascending and stopping at the fully-closed position, in a step of moving the lid from the tilt-up position to the fully-closed position;

detecting an operating speed of the lid near the fully-closed position from the tilt-up position toward the fully-closed position; and reducing a pulse of an over flap in the case that the operating speed is high, and increasing the pulse of the over flap in the case that the operating speed is low, wherein the over flap amount is made constant without relation to a sliding resistance between the lid and the roof.

12. A control apparatus of a sunroof for a vehicle comprising:

a roof provided in a vehicle body;

an opening formed in the roof;

a lid provided in the opening; and a drive unit structured such that the lid has a fully-closed position closing the opening by a forefront position of the lid, a tilt-up position at which a rear end of the lid ascends from the opening, a flap position at which the rear end of the lid is descended from the opening and a fully-open position at which the lid slides rearward so as to leave open the opening, and in the case of moving the lid from the tilt-up position and stopping at the fully-closed position, the lid is temporarily descended a predetermined over flap amount from the fully-closed position, is thereafter ascended and is stopped at the fully-closed position, wherein the fully-closed position is set between a first switch which is operative to produce a signal when the lid is at a little lower position from the fully closed position and a second switch which is operative to produce a signal at a little higher position from the fully closed position, thereby forcibly starting an over flap operation on the basis of the signal of the second switch during movement from the tilt-up position to the fully-closed position, and the roof is descended the over flap amount adjusted to be fixed in correspondence to one of a power supply voltage of the drive unit and an operating speed of the lid set according to a time width of one pulse immediately before the signal of the first switch, and is thereafter ascended, on the basis of the signal of the first switch, whereby the roof is stopped on the basis of the operation of the first switch.

13. A control apparatus of a sunroof for a vehicle according to claim 12, wherein the over flap amount is adjusted on the basis of an operating speed of the lid between the second switch and the first switch.

* * * * *